(No Model.)
E. MATHER.
STOVE PIPE COLLAR.
No. 360,605. Patented Apr. 5, 1887.
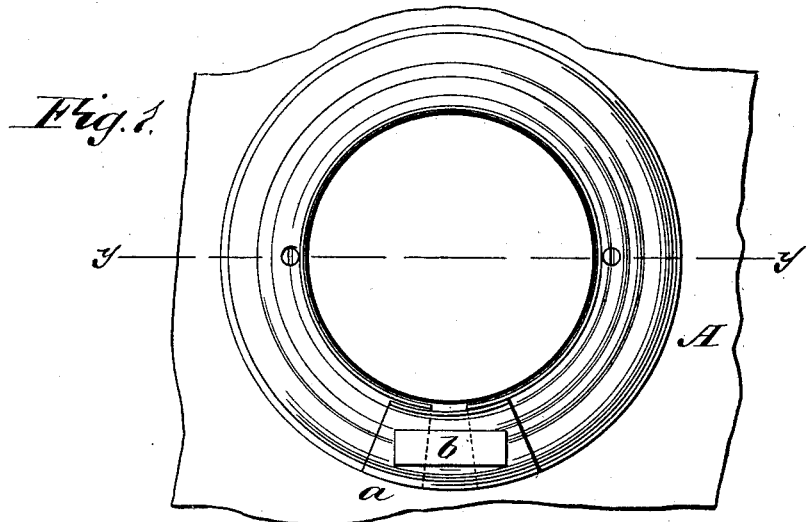
Fig. 1.
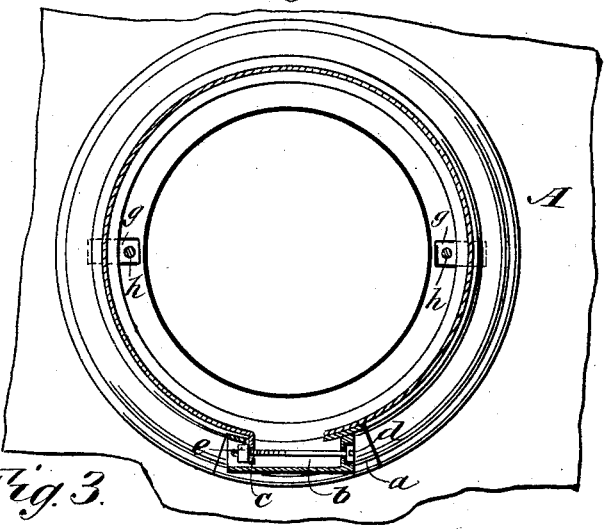
Fig. 2.
Fig. 3.
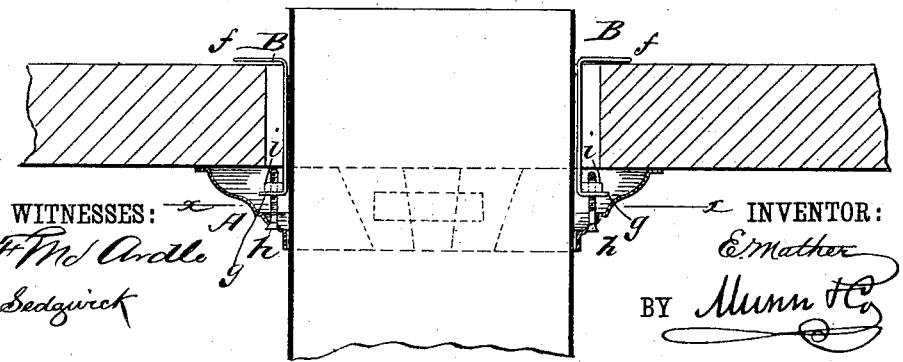
WITNESSES:
F. McArdle
C. Sedgwick
INVENTOR:
E. Mather
BY Munn & Co.
ATTORNEYS.

UNITED STATES PATENT OFFICE.

EDGAR MATHER, OF MATHERTON, MICHIGAN.

STOVE-PIPE COLLAR.

SPECIFICATION forming part of Letters Patent No. 360,605, dated April 5, 1887.

Application filed April 17, 1886. Serial No. 199,190. (No model.)

*To all whom it may concern:*

Be it known that I, EDGAR MATHER, of Matherton, in the county of Ionia and State of Michigan, have invented a new and useful Improvement in Stove-Pipe Collars, of which the following is a specification, reference being had to the annexed drawings, forming a part thereof, in which—

Figure 1 is a side elevation, partly in section. Fig. 2 is a vertical transverse section taken on line $xx$ in Fig. 3. Fig. 3 is a horizontal section taken on line $yy$ in Fig. 1.

Similar letters of reference indicate corresponding parts in the different figures of the drawings.

The object of my invention is to provide a simple and efficient device for clamping a stove-pipe and holding it in its position in the flue.

My invention consists in the construction and arrangement of parts, as will be hereinafter fully described, and claimed.

The collar A is spun or stamped into form in the usual way, and is divided upon one side by cutting out a segment, which leaves an open space, as shown. The open side of the collar has a segmental plate, $a$, covering the opening and overlapping the ends of the collar. This plate is of the same form in cross-section as the collar, and is secured to one end of the collar in position to slide over the opposite end. Upon the face of the plate $a$ is formed a projecting chamber, $b$, open on its upper side and at one end, as shown in Fig. 2, and from the free end of the collar an ear, $c$, projects into the chamber. A bolt, $d$, passes through an opening into the chamber through the opening of the ear $c$, and receives a nut, $e$, beyond the ear, so that when the bolt $d$ is turned, the nut being prevented from turning by the sides of the chamber, the collar A may be contracted or expanded, as circumstances may require.

⸑-shaped straps or plates B are employed for securing the collar in place on the chimney or flue, as shown in Fig. 3, the longer arm, $f$, of the plate being inserted behind the wall of the flue, the shorter arm, $g$, being apertured to receive a bolt, $h$, which passes through the front of the collar, through the arm $g$, and into a nut, $i$, placed behind the arm $g$ and in contact with the body of the plate B.

The divided collar A is placed against the wall of the flue, with its opening coinciding with the opening in the flue, when the angled plates B are brought into engagement with the wall of the flue, as shown in Fig. 3. The bolts $h$ are tightened sufficiently to hold the collar A in its place when the end of the stove-pipe is passed through the collar and into the opening of the flue. The collar is then contracted around the pipe by turning the bolt $d$ until the pipe is clamped tightly in the collar, when the bolts $h$ will be further tightened, drawing the collar closely against the face of the flue, thus holding the stove-pipe firmly in its position in the opening of the flue.

Having thus described my invention, what I claim as new, and desire to secure by Letters Patent, is—

The combination, with the divided collar A, provided with the ear $c$, and segmental plate $a$, having formed thereon a chamber, $b$, of the bolt $d$ and nut $e$, substantially as shown and described.

EDGAR MATHER.

Witnesses:
 W. P. WOOD,
 F. W. WOOD.